Figure 3:
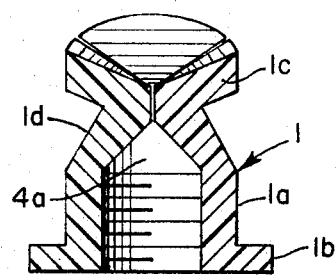

United States Patent [19]
Moen

[11] 3,869,959
[45] Mar. 11, 1975

[54] FASTENER DEVICE

[76] Inventor: George A. Moen, 827 W. 26th Ave., Anchorage, Alaska 99503

[22] Filed: Apr. 26, 1973

[21] Appl. No.: 354,595

[52] U.S. Cl. .................................................. 85/83
[51] Int. Cl. ............................................ F16b 13/04
[58] Field of Search ........................... 85/83, 84, 80

[56] References Cited
UNITED STATES PATENTS

| | | | |
|---|---|---|---|
| 2,033,100 | 3/1936 | Kellogg | 85/83 |
| 2,353,851 | 7/1944 | Rosan | 85/84 |
| 2,379,786 | 7/1945 | Bogg et al. | 85/84 |
| 2,785,726 | 3/1957 | Brush | 85/84 |
| 3,403,958 | 10/1968 | Gross | 85/84 |

FOREIGN PATENTS OR APPLICATIONS
1,025,035   4/1966   Great Britain

*Primary Examiner*—Edward C. Allen
*Attorney, Agent, or Firm*—Lawrence E. Laubscher

[57] ABSTRACT

An expansible self-locking fastener is disclosed for mounting in a hole of a given diameter contained in a support. The fastener includes a resilient unitary body member of a configuration defining flange, body, constricted neck and collar portions, said body member being provided with external rib means that prevent rotation thereof relative to the wall surfaces of the hole.

3 Claims, 3 Drawing Figures

FASTENER DEVICE

This invention relates to a self-locking expansible fastener adapted for mounting in a hole contained in a support. The invention is characterized by the provision of a body member of a configuration defining flange, body, constricted neck and collar portions, external rib means being provided for preventing rotation of the body member relative to the wall surfaces of an opening in which the fastener is mounted.

Various types of expansible self-locking hollow fastening devices are well known in the prior art. These known devices have various structural and/or functional drawbacks, such as the inability of the fastener member to remain properly oriented relative to an opening in which it is introduced during the insertion of an expanding member into the fastener, or failure of the fastener member to be properly expanded into tight frictional contact with the wall surface of the opening in which the fastener is mounted. The fastener member of the present invention was developed to avoid the above and other drawbacks of the known devices.

Accordingly, a primary object of the present invention is to provide an improved radially-expansible fastener member having a resilient unitary body member including longitudinally spaced cylindrical body and collar portions of a diameter equal to that of the hole, and a tapered convergent neck portion of progressively reduced diameter connecting the adjacent ends of the collar and body portions. At its free end, the body portion contains a threaded bore which communicates with a convergent chamber contained in the neck portion.

In accordance with a more specific object of the invention, rib means are provided on the body and neck portions for preventing rotation of the fastener when introduced into the hole. Preferably circumferentially spaced ribs are provided at the juncture between the body and flange portions and the juncture between the neck and collar portions. The collar and neck portions contain longitudinal slits that permit the radial expansion thereof upon the introduction of an expanding member into a threaded bore contained in the free end of the body portion and a communicating convergent chamber contained in the neck portion.

Figure 2:
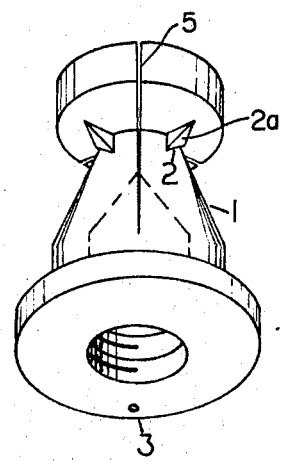
Figure 1:
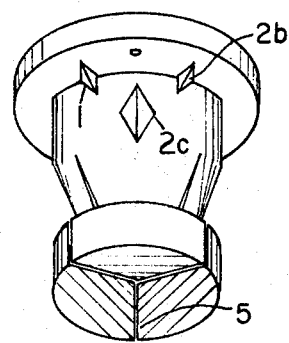

Other objects and advantages of the invention will become apparent from a study of the following specification when viewed in the light of the accompanying drawing, in which:

FIGS. 1 and 2 are rear and front perspective views, respectively, of the fastener body; and FIG. 3 is a longitudinal sectional view of the fastener body.

Referring now to the drawing, the fastener includes a unitary body member 1 formed of resilient material (such as a synthetic plastic material) and includes a cylindrical body portion 1a the outer diameter of which corresponds with the diameter of the hole or opening in which the fastener is to be mounted. At one end, the body portion contains a threaded bore 4 and an external flange portion 1b. The body member also includes a collar portion 1c longitudinally spaced from, and having the same external diameter as, said body portion. The collar and body portions are connected by a tapered constricted neck portion 1d. The body and neck portions contain a plurality of longitudinal slits 5 (preferably three in number) which permit radial expansion of the collar and neck portions when a threaded locking member (such as a pointed screw or eye bolt, not shown) is introduced into the threaded bore 4. To this end, the neck portion contains a chamber 4a which is in communication with the bore 4 and which converges in the direction of the collar. The flange portion contains a hole 3 which may be used to hold the fastener to prevent it from turning during the insertion of the locking member.

Arranged in circumferentially spaced relation at the juncture between the neck and collar portions are a plurality of ribs 2a. Similar ribs 2b are arranged at the juncture between the body and flange portions. Finally, a plurality of circumferentially spaced ribs 2c are provided on the body portion 1a. These ribs prevent rotation of the fastener member relative to the hole in the support in which the fastener member is mounted.

The fastener may be used with a dead end hole drilled into concrete, rock or the like that is deeper than the length of the locking member. Conforming with the length of the fastener, a groove is reamed out into the wall of the hole allowing the divided collar to expand and grip and hold the top of the groove. It may also be used in frigid conditions where there is solid permafrost ground, or in thick ice, to tie down and prevent articles from being blown away. The fastener may also be removed and used again.

What is claimed is:

1. An expansible self-locking fastener member adapted for mounting in a hole of given diameter contained in a support, comprising a unitary resilient fastener member (1) including
   a. a cylindrical body portion (1a) the outer diameter of which corresponds with the hole diameter;
   b. said body portion containing at one end:
      1. a threaded bore (4); and
      2. an external flange portion (1b);
   c. a cylindrical collar portion (1c) spaced from the other end of said body portion, said collar portion having external diameter which equals that of the body portion;
   d. a tapered neck portion (1d) of progressively reduced outer diameter connecting said collar and body portions, said neck portion containing a chamber (4a) in communication at one end with the adjacent end of said threaded bore, said chamber being convergent in the direction of said collar portion;
   e. said collar and neck portions containing at least one longitudinally extending slit to permit the radial outward expansion thereof; and
   f. rib means arranged on the exterior surface of at least one of said body and neck portions for preventing rotation of said fastener means relative to said support, said rib means including a plurality of first ribs arranged in circumferentially spaced relation on said neck portion at the juncture thereof with said collar portion, said first rib means also being connected with said collar portion, whereby upon introduction of the collar and neck portions of the fastener member into the hole in said support and the introduction of a threaded locking member into the threaded bore of said bylindrical portion and at least partially within said neck portion, said collar portion is expanded radially outwardly into tight frictional engagement with the adjacent wall surface of said hole.

2. Apparatus as defined in claim 1, wherein said rib means include a plurality of second circumferentially spaced ribs arranged on said body portion at the juncture thereof with said flange portion, said second ribs also being connected with said flange portion.

3. Apparatus as defined in claim 2, wherein said rib means further include third ribs on said body portion spaced from said flange portion.

* * * * *